United States Patent
Karlsson et al.

(10) Patent No.: US 9,604,297 B2
(45) Date of Patent: Mar. 28, 2017

(54) LIQUID DISPENSING SYSTEM

(71) Applicant: HUSQVARNA AB, Huskvarna (SE)

(72) Inventors: Fredrik Karlsson, Göteborg (SE);
Hans Petersson, Landvetter (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/765,887

(22) PCT Filed: Feb. 5, 2013

(86) PCT No.: PCT/SE2013/050092
§ 371 (c)(1),
(2) Date: Aug. 5, 2015

(87) PCT Pub. No.: WO2014/123459
PCT Pub. Date: Aug. 14, 2014

(65) Prior Publication Data
US 2015/0367432 A1    Dec. 24, 2015

(51) Int. Cl.
*B23D 45/16*    (2006.01)
*B23D 59/02*    (2006.01)
(Continued)

(52) U.S. Cl.
CPC ............. *B23D 59/02* (2013.01); *B23D 45/16* (2013.01); *B28D 7/02* (2013.01); *F16K 3/26* (2013.01); *F16K 5/0478* (2013.01)

(58) Field of Classification Search
CPC ....... B24B 55/02; B24B 53/095; B23D 59/02; B23D 45/16; B28D 7/02; F16K 3/26; F16K 5/0478
(Continued)

(56) References Cited

U.S. PATENT DOCUMENTS 1,698,970 A * 1/1929 Shaff .................... B24B 23/026
173/60
2,307,019 A * 1/1943 Cebik .................... B23D 59/02
29/DIG. 57

(Continued)

FOREIGN PATENT DOCUMENTS

FR    1386873 A    1/1965
GB    848576 A    9/1960
(Continued)

OTHER PUBLICATIONS

International Search Report and Written Opinion in the International Application No. PCT/SE2013/050092 mailed Oct. 14, 2013.
(Continued)

*Primary Examiner* — George Nguyen
(74) *Attorney, Agent, or Firm* — Nelson Mullins Riley & Scarborough LLP

(57) ABSTRACT

The present invention relates to liquid dispensing system for a rotatable work tool (2), comprising a control valve (13), an inlet and outlet liquid guiding device (11, 15). The control valve (13) comprises a housing (18) with a rotatable drum part (19) arranged to rotate. The housing (18) comprises inlet and outlet tubes (21, 22) arranged to be connected to the liquid guiding devices (11, 15). The tubes (21, 11) have corresponding inlet and outlet openings (23) facing the drum part (19). The drum part (19) comprises a first seal (25) and a third seal (27), the seals (25, 27) running around the drum part (19). The third seal (27) has an extension (34) running partially along the first seal (25), such that a first and second volume (28, 29) are formed. Each opening (23, 24) is connected to one of the volumes, or both. At least one volume (29) enables fluid connection between the openings (23, 24) that is variable by means of the third seal (27) moving over one or more of the openings (23). Each such opening has a first maximum extent (30) in a first extension (Continued)

(35) and a second maximum extent (31) in a second extension (36), orthogonal to the first extension (35), the first extent (30) exceeding the second extent (31).

12 Claims, 7 Drawing Sheets

(51) Int. Cl.
  *B28D 7/02* (2006.01)
  *F16K 3/26* (2006.01)
  *F16K 5/04* (2006.01)
(58) Field of Classification Search
  USPC .................................. 451/342, 444, 449, 448
  See application file for complete search history.

(56) References Cited

U.S. PATENT DOCUMENTS

| | | | | |
|---|---|---|---|---|
| 2,695,036 A | | 11/1954 | Kronheim | |
| 3,027,625 A | * | 4/1962 | Milstead | B23Q 11/141 184/26 |
| 3,110,993 A | * | 11/1963 | Grage | B24D 7/10 451/450 |
| 3,179,184 A | * | 4/1965 | Jackson | B25H 1/0021 173/3 |
| 4,011,889 A | * | 3/1977 | Smith | F16K 3/246 137/614.11 |
| 4,091,577 A | * | 5/1978 | Ortiz | B24B 55/02 451/359 |
| 4,962,617 A | * | 10/1990 | Tilders | B23D 47/12 123/185.3 |
| 5,582,541 A | * | 12/1996 | Hutchins | B24B 23/03 451/344 |
| 5,597,348 A | * | 1/1997 | Hutchins | B24B 23/03 451/295 |
| 6,442,841 B1 | | 9/2002 | Nilsson et al. | |
| 7,189,154 B1 | * | 3/2007 | Karppinen | B24B 57/02 451/357 |
| 8,449,356 B1 | * | 5/2013 | Sae-Lee | B24B 55/02 29/890.09 |
| 2002/0045415 A1 | | 4/2002 | Bath | |
| 2006/0288992 A1 | | 12/2006 | Baratta | |
| 2007/0240313 A1 | | 10/2007 | Layher et al. | |
| 2011/0037307 A1 | * | 2/2011 | Bollinger | B28D 1/045 299/18 |
| 2012/0312138 A1 | | 12/2012 | Salomon et al. | |

FOREIGN PATENT DOCUMENTS

| | | | | |
|---|---|---|---|---|
| GB | | 2352997 A | 2/2001 | |
| GB | | 2424689 A | 10/2006 | |
| JP | WO | 2009011454 A1 * | 1/2009 | ........... B23D 59/006 |
| VG | EP | 2236234 A1 * | 10/2010 | ............ B23D 59/02 |
| WO | | 03041921 A1 | 5/2003 | |

OTHER PUBLICATIONS

International Preliminary Report on Patentability in the International Application No. PCT/SE2013/050092 issued Aug. 11, 2015.

* cited by examiner

LIQUID DISPENSING SYSTEM

TECHNICAL FIELD

The present invention relates to a liquid dispensing system arranged for adding a liquid to a rotatable work tool of an engine-driven tool. The system comprises a control valve, an inlet liquid guiding device and at least one outlet liquid guiding device. The control valve comprises a housing and a rotatable drum part mounted in the housing and being arranged to rotate around a drum part axis running through the drum part and being perpendicular to a radial extension of the drum part. The housing comprises an inlet tube arranged to be connected to the inlet liquid guiding device and at least one outlet tube arranged to be connected to said outlet liquid guiding device. The inlet tube has an inlet opening that is arranged to face the drum part, and each outlet tube having an outlet opening arranged to face the drum part. The drum part comprises a first seal running circumferentially around the drum part.

BACKGROUND

Many motor tools such as engine-driven handheld cutting machines have saw blades which may be circular or ring-shaped. Such a cutting machine may be used for cutting hard materials such as concrete, where the cutting procedure may result in the creation of dust. For example concrete dust is unhealthy to breathe and also impairs visions, and it is desired to minimize the creations of such dust that freely may expand in the air. Such free concrete dust that finds its way into the engine of the tool could affect the engine in a negative way.

Many tools of the above type or for this purpose equipped with a water supply, where a flow of water is directed towards the saw blade in such a way that a large quantity of the dust is mixed with the water and thus retained and kept from expanding in the air. The flow of water is preferably held at a minimum while maintaining a proper function, since the water normally has to be taken care of at the working site, and more water than necessary is undesirable. Tools of the above type are therefore equipped with a valve which the user may operate to obtain a flow of water providing a desired effect. However, today these valves are of a relatively simple design, being either of the on/off type, or of a type with a relatively rough setting of the water flow. GB 2352997 shows a liquid dispensing system for a handheld cutting machine. It has a control valve conveniently located. But the valve handle must be turned several revolutions to adjust this throttling valve, which is awkward. Another system has a valve handle that only needs to be turned 90 degrees. But this valve has a conical inner rubber body that is turned inside a conical plastic housing. The conical shape gives an axial force. But the conical rubber body is also strongly pretensioned into the housing to make the arrangement watertight. All this creates a valve handle that is hard to turn for the user.

It is therefore desired to provide such a valve that is arranged for a smooth and stepless change of water flow which is easily manageable for a tool user.

SUMMARY

The object of the present invention is to provide a liquid dispensing system for a motor tool, the liquid dispensing system comprising a valve for controlling water dispensing, where the valve may be used to control the water in a smooth and stepless way which is easily manageable for a tool user.

This object is achieved by means of a liquid dispensing system arranged for adding a liquid to a rotatable worktool of an engine-driven tool. The system comprises a control valve, an inlet liquid guiding device and at least one outlet liquid guiding device. The control valve comprises a housing and a rotatable drum part mounted in the housing and being arranged to rotate around a drum part axis running through the drum part and being perpendicular to a radial extension of the drum part. The housing comprises an inlet tube arranged to be connected to the inlet liquid guiding device and at least one outlet tube arranged to be connected to said outlet liquid guiding device. The inlet tube has an inlet opening that is arranged to face the drum part, and each outlet tube having an outlet opening arranged to face the drum part. The drum part comprises a first seal running circumferentially around the drum part.

The drum part further comprises a third seal having a longitudinal extension running around the drum part partially along the first seal, such that a first volume is formed between the first seal, the third seal, the drum part and the housing. Furthermore, a second volume is formed between at least the third seal, the drum part and the housing. Each one of the inlet opening and each outlet opening is connected to either the first volume, the second volume or to both the first volume and the second volume. At least one volume has such a circumferential extension that the inlet opening and at least one outlet opening are in fluid connection with each other for at least one certain position of the drum part. The fluid connection is variable by means of the third seal being arranged to run across and move over one of said openings by means of a rotating movement of the drum part. In this way, a gradual increase or decrease of said fluid connection is accomplished. Each of said openings over which the third seal is arranged to move has a first maximum extent in a first extension and a second maximum extent in a second extension, orthogonal to the first extension. The first extent is exceeding the second extent.

According to an example, the drum part comprises a second seal running circumferentially around the drum part such that the inlet opening and each outlet opening are positioned between the first seal and the second seal. The longitudinal extension of the third seal is running both along and between the first seal and the second seal. The second volume is formed between the second seal, the third seal, the drum part and the housing.

According to another example, the liquid guiding devices are in the form of hoses. At least one hose may at least partly run in a holding device, the holding device being mounted to the engine-driven tool.

Other examples are disclosed in the dependent claims.

A number of advantages are obtained by means of the present invention. Mainly, a smooth and stepless control of the water flow is provided, the control being easily manageable for a tool user

BRIEF DESCRIPTION OF THE DRAWINGS

The present invention will now be described more in detail with reference to the appended drawings, where.

DETAILED DESCRIPTION

Figure 1:
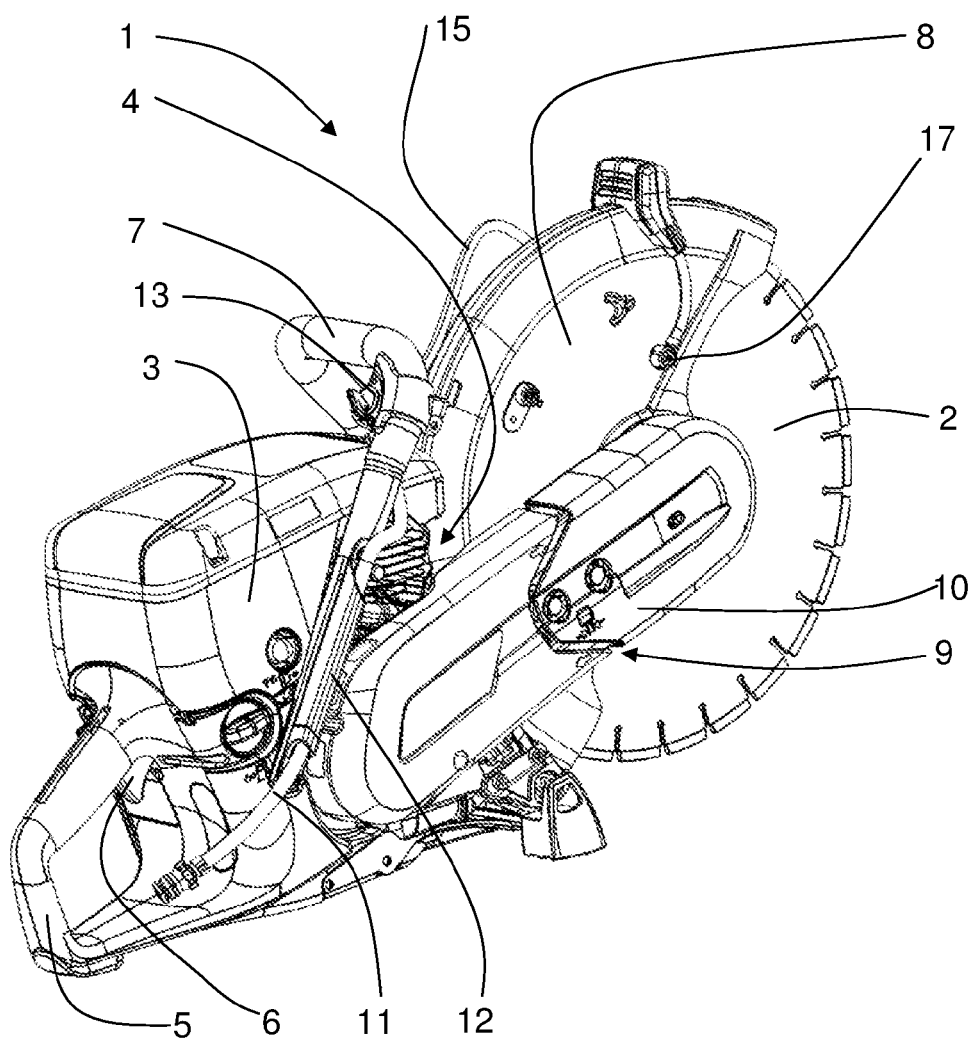
FIG. 1 shows a first back perspective view of a hand-held power cutter.
Figure 2:
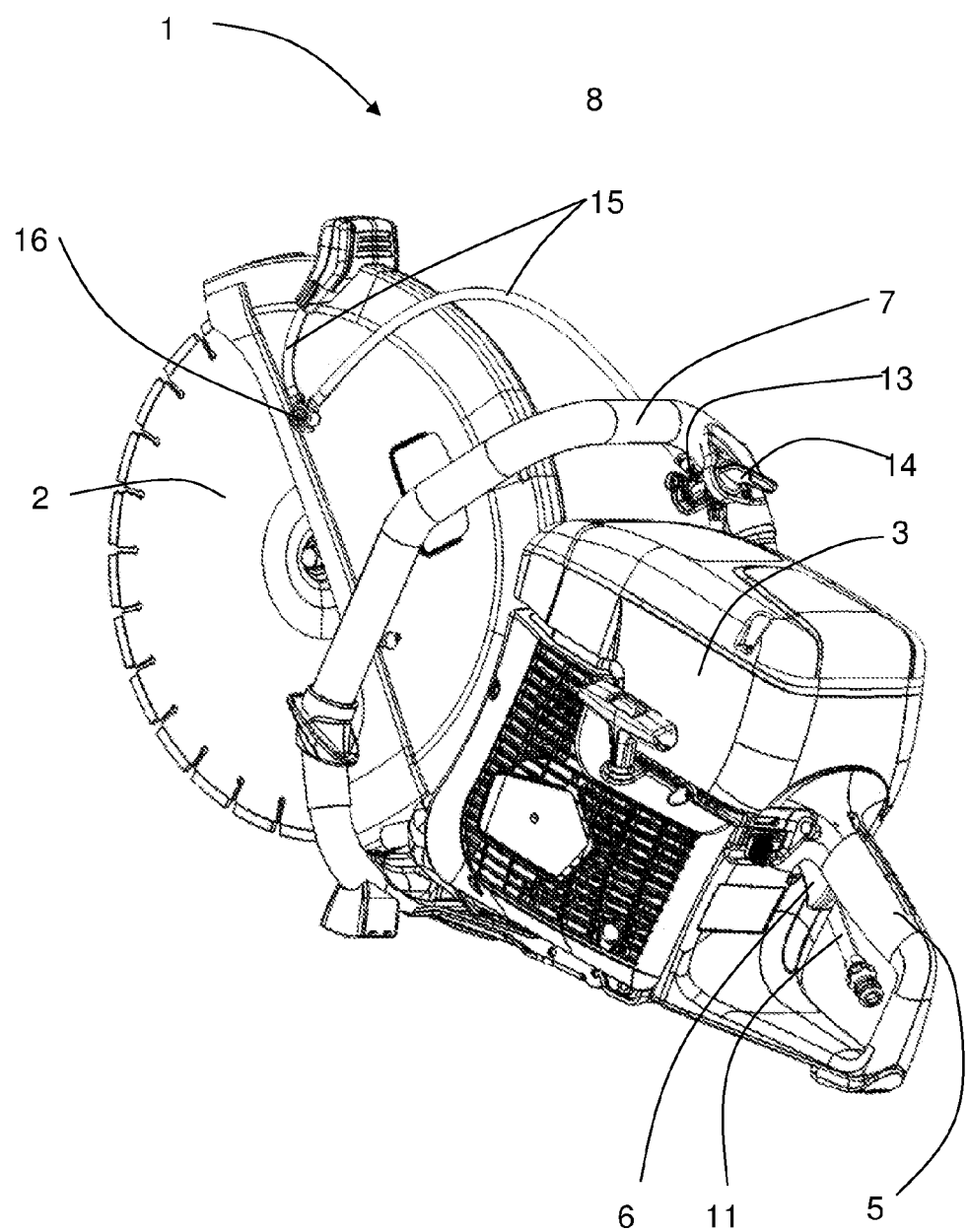
FIG. 2 shows a first back perspective view of a hand-held power cutter.

With reference to FIG. 1 and FIG. 2, there is a hand-held power cutter 1 with a ring-shaped saw blade 2, for example suitable to cut through concrete. The power cutter 1 comprises a casing 3 at least partly enclosing a combustion engine 4, where the casing 3 in turn comprises a first handle part 5 from which a power/throttle switch 6 is accessible. The power cutter 1 further comprises a second handle part 7 that runs in an arcuate shape over the casing 3, the second handle part 7 being attached to the casing 3 via means that attenuate vibrations in a well-known manner.

The power cutter 1 comprises a shielding cover 8 that is arranged to pivotingly shield a part of the saw blade 2. The saw blade 2 is connected to the engine 4 with a power transferring means 9 that is positioned beneath a power transfer cover 10.

The power cutter 1 further comprises an inlet water hose 11 that is attached to a hose holder 12 which in turn is attached to the casing 3. The inlet water hose 11 is connected to a control valve 13 that has a switch handle 14 which is accessible when holding the second handle 7. By means of the switch handle 14, the control valve 13 is controlled to connect or disconnect water flow from the inlet water hose 11 to an outlet water hose 15.

The outlet water hose 15 is attached to the shielding cover 8 and runs to a first water dispensing unit 16 and from there to a second water dispensing unit 17. The water dispensing units 16, 17 are attached to opposite sides of the shielding cover 8, and are arranged to spray water onto the saw blade 2 during operation. The water is mainly used for preventing saw dust to expand freely into the air, the saw dust being mixed with the water. The water dispensing units 16, 17 may be in the form of spray nozzles.

Figure 3:
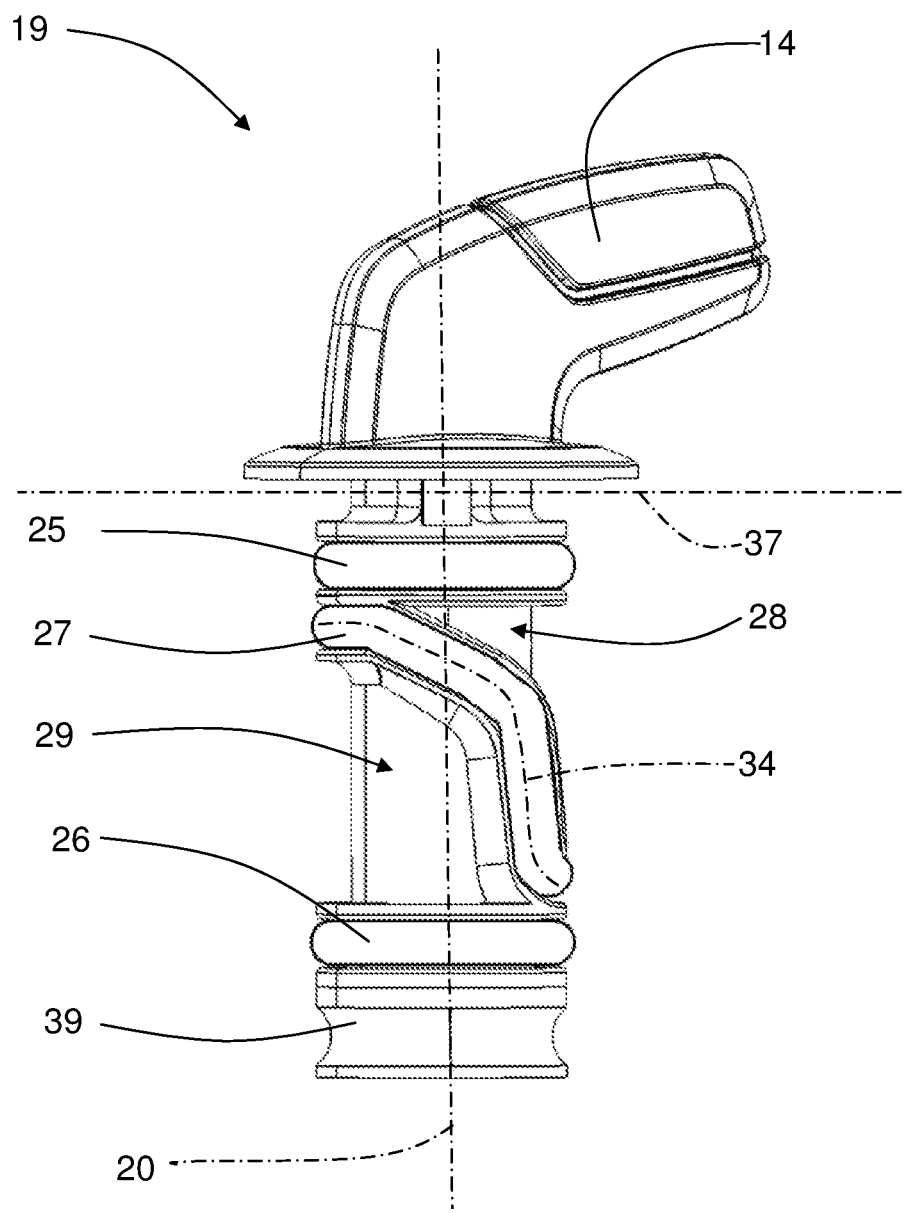
FIG. 3 shows a side view of a drum part.
Figure 4:
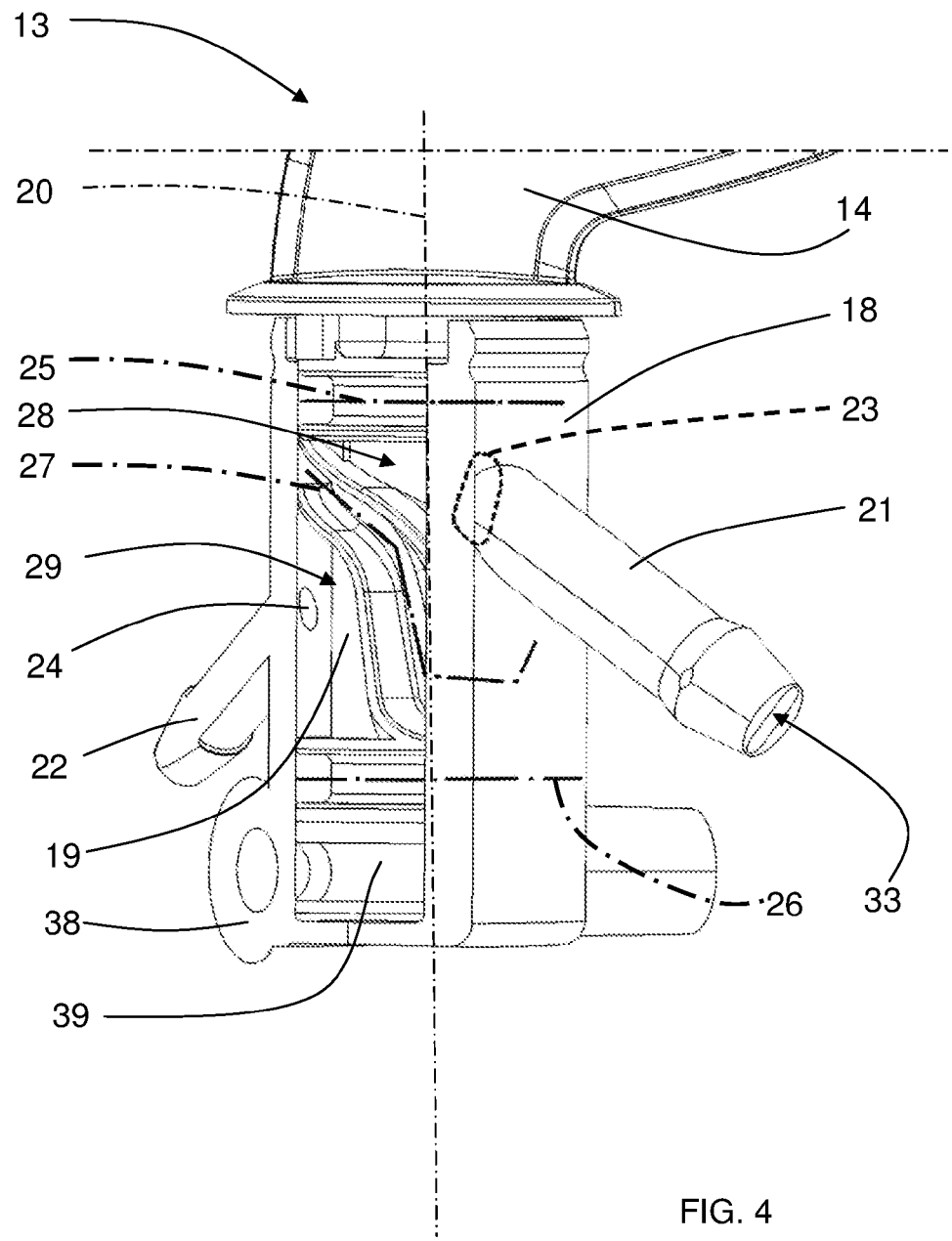
FIG. 4 shows a partially cut-open side view of a control valve in a first position.
Figure 5:
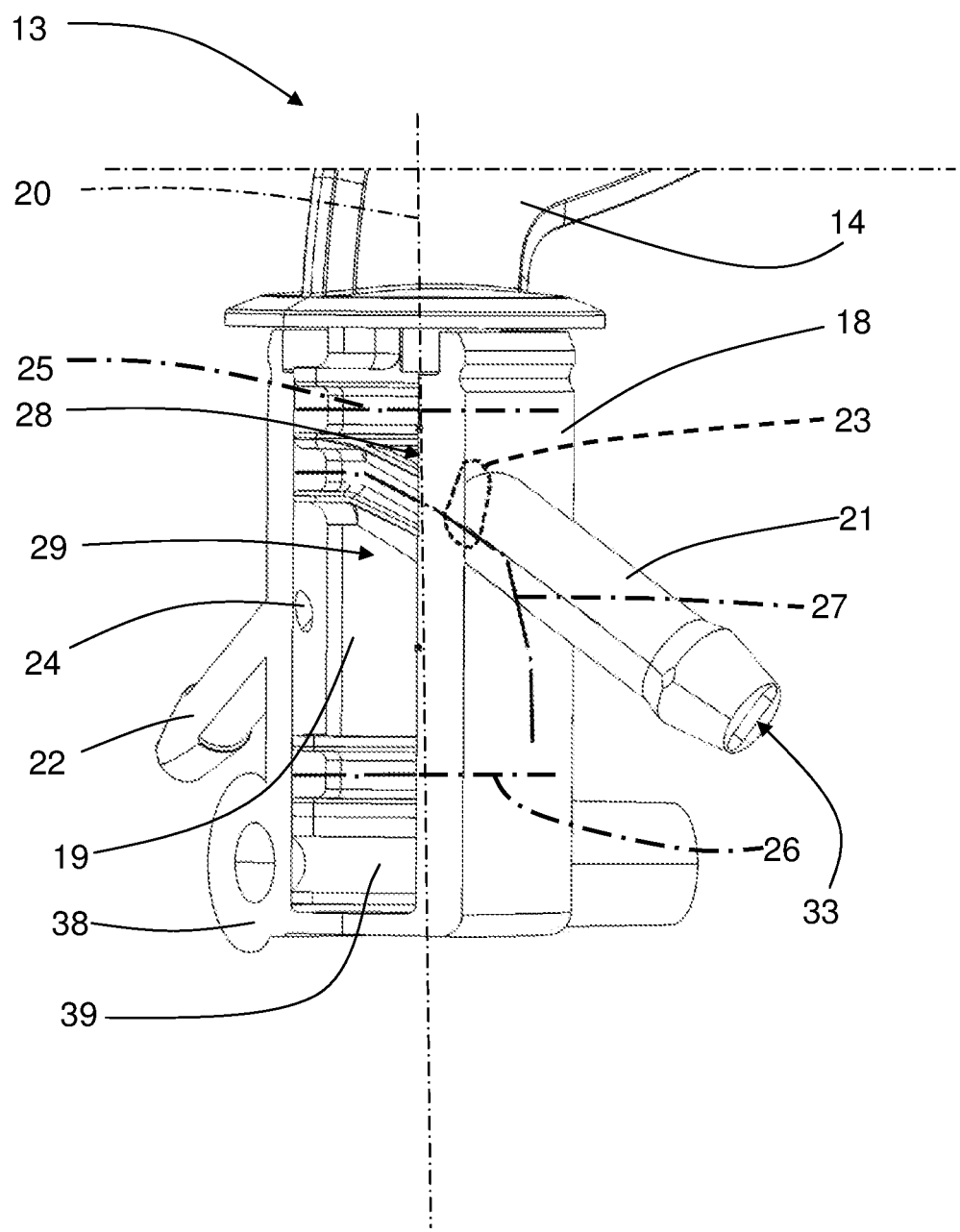
FIG. 5 shows a partially cut-open side view of a control valve in a second position.
Figure 6:
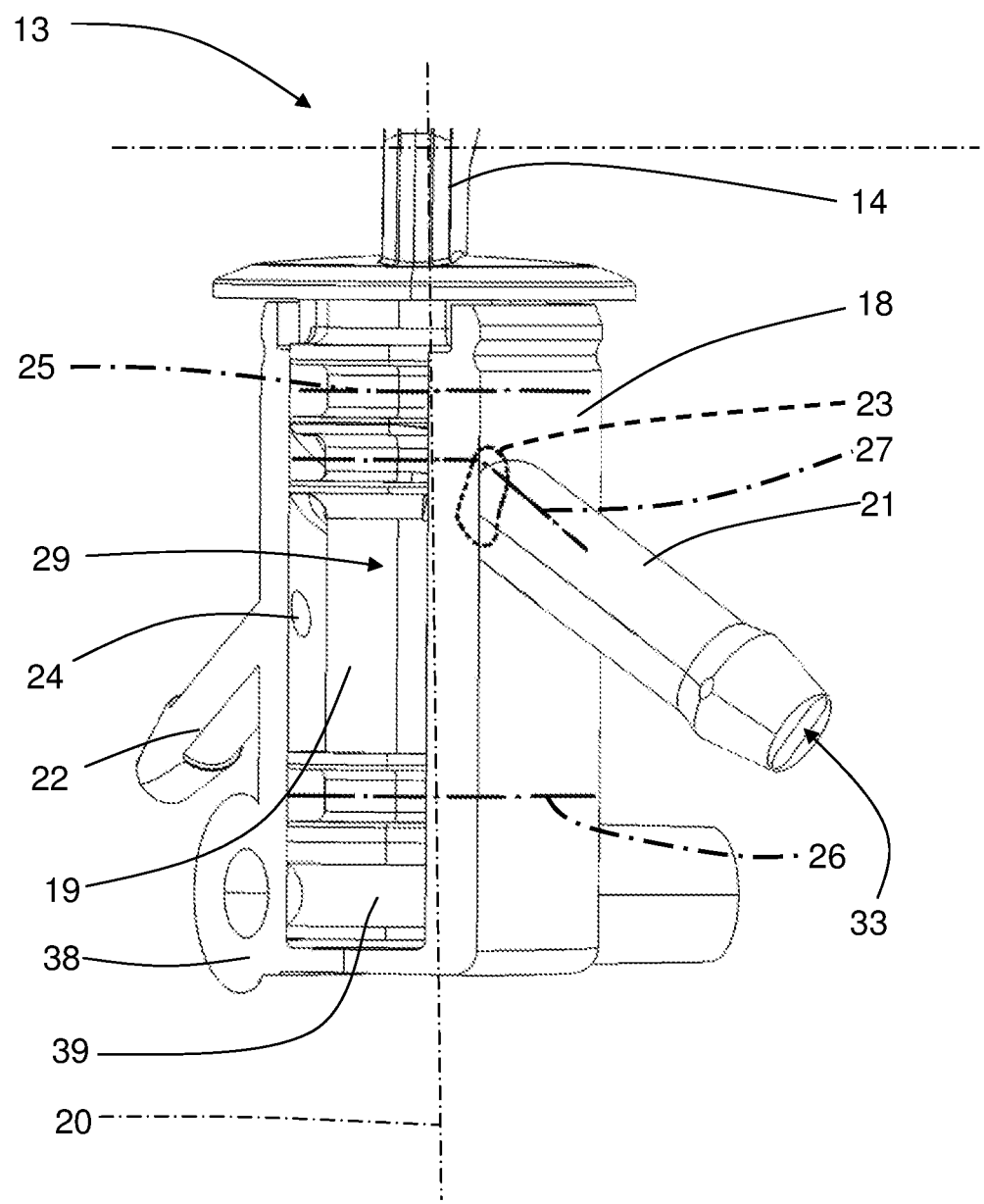
FIG. 6 shows a partially cut-open side view of a control valve in a third position.

By means of the control valve 13, a user may control the flow of water onto the saw blade 2. The control valve 13 will now be described more in detail with reference to FIG. 3, FIG. 4, FIG. 5 and FIG. 6. FIG. 3 shows a side view of a drum part comprised in the control valve. FIG. 4, FIG. 5 and FIG. 6 shows a partial cut-open view of the control valve with the drum part in a closed position, a partially open position and in an open position, correspondingly.

The control valve 13 comprises a housing 18 and a rotatable drum part 19 which normally is mounted in the housing 18 and is arranged to rotate around a drum part axis 20 running through the housing 18 and being perpendicular to a radial extension 37 of the drum part 19. The drum part 19 is rotatable around the drum part axis 20 by a user by means of the switch handle 14, such that an angular position of the drum part 19 is altered.

The housing 18 comprises an inlet tube 21 arranged to be connected to the inlet water hose 11 and one outlet tube 22 arranged to be connected to the outlet water hose 12. The inlet tube 21 has an inlet opening 23 that is arranged to face the drum part 19, and the outlet tube 22 has an outlet opening 24 also arranged to face the drum part 19. The drum part 19 comprises a first seal 25 and a second seal 26, said seals 25, 26 running circumferentially around a radial periphery of the drum part 19 such that the inlet opening 23 and the outlet opening 24 both are positioned between the first seal 25 and the second seal 26. The first seal 25 is positioned closer to the switch handle 14 than the second seal 26.

According to the present invention, the drum part 19 further comprises a third seal 27 with a longitudinal extension 34 running around the drum part 19, both between and along the first seal 25 and the second seal 26. It is here to be noted that the seals 25, 26, 27 are shown in a normal manner in FIG. 3 only. In FIG. 4, FIG. 5 and FIG. 6, the seals are instead indicated with a bold dash-dotted line, where this bold dash-dotted line indicates a contact surface of the seals against the housing 18. This means of displaying the seals 25, 26, 27 in FIG. 4, FIG. 5 and FIG. 6 has been chosen for reasons of clarity. Since the seals 25, 26, 27 in this example are in the form of O-rings, the contact surfaces are relatively small in relation to the diameter of the O-rings. The bold dash-dotted line for the third seal 27 coincides with the longitudinal extension 34 of the third seal 27.

The third seal runs 27 in such a way that a first volume 28 is formed between the first seal 25, the third seal 27, the drum part 19 and the housing 18, and in such a way that a second volume 29 is formed between the second seal 26, the third seal 28, the drum part 19 and the housing 18.

The inlet opening 23 and the outlet opening 24 are connected to either the first volume 28, the second volume 29 or to both the first volume 28 and the second volume 29 due to the angular positioning of the drum part 19 and more specifically due to the positioning of the third seal 27 with respect to the inlet opening 23 and the outlet opening 24.

The second volume 29 has such a circumferential extension along the drum part 19 that the inlet opening 23 and the outlet opening 24 are in fluid connection with each other for at least one certain angular position of the drum part 19.

The fluid connection is variable by means of the third seal 27 being arranged to run across and move over the inlet opening 23 by means of a rotating movement of the drum part 19, such that a gradual increase or decrease of said fluid connection is accomplished The water flow through the control valve 13 is increased when the fluid connection between the inlet opening 23 and the outlet opening 24 is increased via the second volume 29.

The inlet opening 23 has an oval shape having a longitudinal extension 35, where the third seal 27 is moved along this longitudinal extension 35 when the drum part 19 is rotated. This provides a smooth and stepless gradual increase or decrease of water flow, since the area of the inlet opening 23 that is opened to the second volume 29 is evenly increased or decreased.

As indicated in FIG. 4, FIG. 5 and FIG. 6, it can be noted that not only the inlet opening 23 has such a shape, but the whole inlet tube 21 has such an oval or at least elongated cross-section 33.

Figure 7:
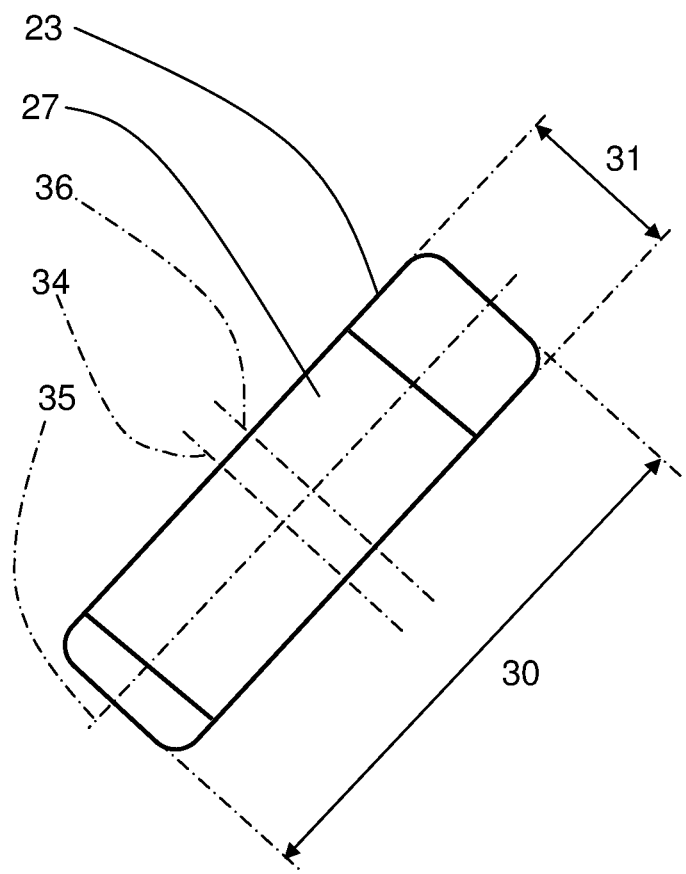
FIG. 7 shows an enlarged view of an inlet opening and a third seal behind it.

Generally, with reference to FIG. 7 showing an enlarged view of the inlet opening 23 and the third seal 27 behind it, the inlet opening 23 has a first maximum extent 30 along a first extension 35 and a second maximum extent 31 along a second extension 36, the second extension 36 being orthogonal to the first extension 35 and being orthogonal to the longitudinal extension 34 of the third seal 27 where the third seal 27 is facing the inlet opening 23. It is to be noted that this also means that the longitudinal extension 34 of the third seal 27 is parallel to the second extension 36 where the third seal 27 is facing the inlet opening 23. Due to the shape of the third seal 27 as it runs around the drum part 19, its longitudinal extension 34 has other directions at other positions than where the third seal 27 is facing the inlet opening 23.

The working of the control valve 13 will now be described more in detail with reference to FIG. 4, FIG. 5 and FIG. 6.

FIG. 4 shows a closed position where the inlet opening 23 is in fluid connection with the first volume 28 and where the outlet opening 24 is in fluid connection with the second volume 29, the inlet opening 23 and the outlet opening 24 thus being completely separated by means of the third seal 27.

FIG. 5 shows a partially opened position, where there is a relatively small fluid connection between the inlet opening 23 and the outlet opening 24, since the contact surface of the third seal 27 has moved past the edge of the inlet opening 23, allowing the inlet opening to be in fluid contact with the second volume 29.

FIG. 6 shows an almost completely opened position, where the contact surface of the third seal 27 has moved almost past the inlet opening 23, thus almost allowing a complete fluid connection between the inlet opening 23 and the outlet opening 24 via the second volume 29.

During the above opening procedure, the switch handle 14 and thus the drum unit 19 have been turned counter-clockwise when regarding the switch handle 14 from above.

The present invention is not limited to the example given above, but may vary freely within the scope of the claims. For example, it may be the outlet opening 24 instead of the inlet opening 23 that is opened and closed against the second volume 29 by means of the third seal 27. Then the outlet opening 24 has the shape defined for the inlet opening 23, the third seal 27 running across the outlet opening 24 in the manner described for the inlet opening 23.

It is also conceivable that the both the inlet opening 23 and the outlet opening 24 have this shape, and that the third seal 27 running across both the inlet opening 23 and the outlet opening 24 in the manner described when regulating the flow of water.

It is furthermore conceivable that there are more outlet openings and corresponding outlet tubes than the one described.

The inlet water hose 11 and the outlet water hose 15 are generally in the form of a corresponding inlet liquid guiding device 11 and at least one outlet liquid guiding device 15, the number of outlet liquid guiding devices depending on the number of outlet tubes. The liquid guiding devices 11, 15 do not have to be in the form of the described hoses, but may for example be in the form of tubes.

The liquid does not have to be water, but any suitable liquid.

The hand-held power cutter 1 with the ring-shaped saw blade 2 may be any type of engine-driven tool with a rotatable worktool such as a saw blade, a circular saw blade, a ring saw blade or a saw chain. Only some items of the engine-driven tool in the example have been described, the engine-driven tool in itself being of a well-known kind.

The hose holder 12 is generally in the form of a holding device, the holding device being mounted to the engine-driven tool 1. By means of the hose holder 12, the hose in question is for example prevented from coming too near the engine 4 which may become very hot, or to block any ventilation path. The inlet water hose 11 thus at least partly runs within the holding device 12, preferably at least during 3 cm, preferably during at least 4 cm and more preferably during at least 6 cm. The holding device 12 thus constitutes a hose protecting device and may comprise a hose cover in the form of a longitudinally extending housing, which for example is at least 3 cm long, preferably at least 4 cm long, and most preferably at least 6 cm long. Such a hose cover may have a wall thickness of for example 2 mm, providing protection for the hose in the case of the hose for example being struck into sharp objects or scratched by concrete while cutting etc. The holding device is preferably manufactured by injection molded plastic and preferably also containing glass fibre. This holding device could also be used together with a more conventional type of control valve.

The holding device 12 may be fastened to a part of the first handle part 5, preferably the right hand side. This fastening may be performed by using 2 of 3 screws that attach the first handle part 5 to the second handle part 7 and to an anti-vibration element connected in its other end to the engine cylinder.

The inlet opening 23, or in the general case, each of those openings over which the third seal 27 is arranged to move, has an oval or at least elongated shape, where the first maximum extent 30 preferably may be at least 1.5 times longer than the second maximum extent 31. The shape of the inlet opening 23 may be irregular, such that for example the flow increases at a higher rate at the end of the opening rotation of the drum. The shape may also be rectangular or trapezoidal.

When terms like orthogonal, parallel and the like are used, these terms are not to be interpreted as mathematically exact, but within what is practically obtainable.

The seals 25, 26, 27 have been described as O-rings, but other types of seals are of course conceivable.

As shown in FIG. 4, FIG. 5 and FIG. 6, the housing 18 may comprise a locking tube 38 arranged for receiving a locking pin or a locking screw (not shown). When inserted, said locking pin or a locking screw engages a circumferential groove 39 (also indicated in FIG. 3) in the drum part 19, providing an axial lock between the housing 18 and the drum part 19.

Preferably, the switch handle 14 is rotatable between two fixed positions, the fixed positions corresponding to a closed control valve 13 and a maximum opened control valve. This is arranged in that two diametrically opposite protruding stops in the drum part 19 each meet a protruding stop in the housing 18. These stops are arranged above the first seal 25. By using double stops there is no risk that the drum part moves to the side and passes a single stop. The switch handle can preferably be turned 100-120 degrees between the two fixed positions. This helps fine tuning.

It is conceivable that the second seal 26 is omitted; the second volume 29 then being formed between the third seal 27, the drum part 19 and the housing 18. In this case, there is an increased axial force acting on the drum. Furthermore, the locking tube 38 has to be arranged on the other side of the first seal 25; alternatively, the locking pin or a locking screw is arranged in the locking tube 38 in a water-tight manner. However it is preferred to use the second seal and to use a fully cylindrical housing 18. Hereby an axial force on the drum part 19 can be completely avoided. Preferably the housing is made of a very form stable, injection molded, plastic material that enables a very accurate and stable inner cylindrical area. The housing 18 is attached to the second handle 7 in that a hook part embracing at least half of the pipe of the handle 7 is mounted to the housing 18 by pressing the housing into a snap fit at the top of the housing, see FIG. 2. Thereafter the drum part 19 is inserted and locked by a locking screw in the locking tube 38. This screw is secured in the hook part, so it presses the housing 18 together with the hook part and thereby secures the control valve to the second handle part 7.

Thus, in general terms, the second volume 29 is formed between at least the third seal 27, the drum part 19 and the housing 18. The third seal 27 partially runs along the first seal 25.

The second extension 36 does not have to be orthogonal to the longitudinal extension 34 of the third seal 27 where the third seal 27 faces the inlet opening 23. The longitudinal extension 34 of the third seal 27 may instead be inclined, for example up to 30°, with respect to the first extension 35.

The effective movement of the third seal 27 across the opening 23 does not have to run exactly along the longitudinal extension 35 when the drum part 19 is rotated, but may instead be inclined, for example up to 30°, with respect to the first extension 35.

The invention has been described for a hand held cutting machine driven by an internal combustion engine. Of course the machine could also be driven by an electrique, hydraulic or air powered engine. These are main uses. But further the engine-driven tool could be an electric drill motor, hand held or mounted to a stand. And further a tile and masonry saw or a flat saw.

The invention claimed is:

1. A liquid dispensing system arranged for adding a liquid to a rotatable work tool of an engine-driven tool, the system comprising
   a control valve,
   an inlet liquid guiding device, and
   at least one outlet liquid guiding device, wherein the control valve comprises a housing and a rotatable drum part mounted in the housing and being arranged to rotate around a drum part axis running through the drum part and being perpendicular to a radial extension of the drum part, the housing comprising an inlet tube arranged to be connected to the inlet liquid guiding device and at least one outlet tube arranged to be connected to said outlet liquid guiding device, the inlet tube having an inlet opening that is arranged to face the drum part, and each outlet tube having an outlet opening arranged to face the drum part, where the drum part comprises a first seal, said first seal running circumferentially around the drum part, and
   wherein the drum part further comprises a third seal having a longitudinal extension running around the drum part partially along the first seal, such that a first volume is formed between the first seal, the third seal, the drum part and the housing, and such that a second volume is formed between at least the third seal, the drum part and the housing, each one of the inlet opening and each outlet opening being connected to either the first volume, the second volume or to both the first volume and the second volume, at least one volume having such a circumferential extension that the inlet opening and at least one outlet opening are in fluid connection with each other for at least one certain position of the drum part, said fluid connection being variable by means of the third seal being arranged to run across and move over one of said openings by means of a rotating movement of the drum part, such that a gradual increase or decrease of said fluid connection is accomplished, where each of said openings over which the third seal is arranged to move has a first maximum extent in a first extension and a second maximum extent in a second extension, orthogonal to the first extension, the first maximum extent exceeding the second maximum extent.

2. A liquid dispensing system according to claim 1, wherein the drum part comprises a second seal running circumferentially around the drum part such that the inlet opening and each outlet opening are positioned between the first seal and the second seal, wherein the longitudinal extension of the third seal is running both along and between the first seal and the second seal, and wherein the second volume is formed between the second seal, the third seal, the drum part and the housing.

3. A liquid dispensing system according to claim 1, wherein the third seal is arranged to move over said opening along the first extension.

4. A liquid dispensing system according to claim 1, wherein each of said openings over which the third seal is arranged to move has an elongated shape, where the first maximum extent is at least 1.5 times longer than the second maximum extent.

5. A liquid dispensing system according to claim 1, wherein the liquid guiding devices are in the form of hoses.

6. A liquid dispensing system according to claim 5, wherein at least one hose at least partly is running in a holding device, the holding device being mounted to the engine-driven tool, and wherein the holding device comprises a hose cover in the form of a longitudinally extending housing, which is at least 3 cm long.

7. A liquid dispensing system according to claim 1, wherein the seals are in the form of O-rings.

8. A liquid dispensing system according to claim 1, wherein the rotating work tool is in the form of a circular saw blade, a ring-shaped saw blade or a saw chain.

9. A liquid dispensing system according to claim 6, wherein the engine-driven tool is a hand held cutting machine having a first handle part and a second handle part, the second handle part being closer to the rotatable work tool than the first handle part.

10. A liquid dispensing system according to claim 9, wherein the holding device is fastened to a right hand side part of the first handle part.

11. A liquid dispensing system according to claim 9, wherein the protecting device is fastened to the first handle part using 2 of the 3 screws that attach the first handle part to the second handle part and to an anti-vibration element connected in its other end to an engine cylinder.

12. A liquid dispensing system according to claim 1, wherein the first maximum extent is orthogonal to the longitudinal extension of the third seal where the third seal is facing said opening.

* * * * *